United States Patent
Lu et al.

(10) Patent No.: US 8,023,255 B2
(45) Date of Patent: Sep. 20, 2011

(54) DISPLAY DEVICE

(75) Inventors: Tzu-Hao Lu, Taipei (TW); Kang-Yeh Yu, Taipei (TW); His-Ming Cheng, Taipei (TW)

(73) Assignee: Compal Electronics, Inc., Taipei (TW)

( * ) Notice: Subject to any disclaimer, the term of this patent is extended or adjusted under 35 U.S.C. 154(b) by 114 days.

(21) Appl. No.: 12/416,117

(22) Filed: Mar. 31, 2009

(65) Prior Publication Data

US 2010/0118480 A1     May 13, 2010

(30) Foreign Application Priority Data

Nov. 13, 2008 (TW) ................................ 97143941 A

(51) Int. Cl.
    *G06F 1/16*             (2006.01)

(52) U.S. Cl. ................................................. 361/679.26

(58) Field of Classification Search ............. 361/679.26; 345/59, 173, 175
See application file for complete search history.

(56) References Cited

U.S. PATENT DOCUMENTS

| | | | | | |
|---|---|---|---|---|---|
| 4,771,277 | A | * | 9/1988 | Barbee et al. | ........... 345/173 |
| 5,422,751 | A | * | 6/1995 | Lewis et al. | ............... 349/59 |
| 5,729,250 | A | * | 3/1998 | Bishop et al. | .......... 345/175 |
| 5,923,319 | A | * | 7/1999 | Bishop et al. | .......... 345/175 |
| 6,002,582 | A | * | 12/1999 | Yeager et al. | ....... 361/679.21 |
| 6,628,268 | B1 | * | 9/2003 | Harada et al. | .......... 345/173 |
| 7,626,808 | B2 | * | 12/2009 | Tai et al. | ........... 361/679.21 |
| 7,626,809 | B2 | * | 12/2009 | Tai et al. | ........... 361/679.21 |
| 2008/0304216 | A1 | * | 12/2008 | Lu | ......................... 361/681 |

* cited by examiner

*Primary Examiner* — Lisa Lea-Edmonds
(74) *Attorney, Agent, or Firm* — Jianq Chyun IP Office

(57) ABSTRACT

A display device is provided. The display device is adapted for a notebook computer. The display device includes a display panel, a bezel, a back shell, and a reinforced glass plate. The bezel includes a receiving recess and an opening. The display panel is disposed in the receiving recess. The bezel exposes a part of the display panel from the opening. The back shell is assembled with the bezel. The back shell and the bezel cooperatively define an accommodating space. The display panel is accommodated in the accommodating space. The reinforced glass plate is assembled to the bezel for covering the part of the display panel exposed by the opening of the bezel.

4 Claims, 2 Drawing Sheets

DISPLAY DEVICE

CROSS-REFERENCE TO RELATED APPLICATION

This application claims the priority benefit of Taiwan application serial no. 97143941, filed on Nov. 13, 2008. The entirety of the above-mentioned patent application is hereby incorporated by reference herein and made a part of specification.

BACKGROUND OF THE INVENTION

1. Field of the Invention

The present invention generally relates to display device, and more particularly, to a display device for a notebook computer.

2. Description of Related Art

A typical notebook computer is constituted by a host and a display device pivotally connected to the host. A user is allowed to close the notebook computer by rotating the display device to the host for the convenience of carrying. When the user is going to operate the notebook computer, he can rotate the display device open from the host for convenience of operation. However, when the display device is in an opening status, the display panel of the display device may be damaged when unfortunately being impacted by external forces, especially when being operated in an outdoor environment or in a particular environment.

SUMMARY OF THE INVENTION

Accordingly, the present invention is directed to provide a display device having a display panel being well protected.

The present invention provides a display device, adapted for a notebook computer. The display device includes a display panel, a bezel, a back shell, and a reinforced glass plate. The bezel includes a receiving recess and an opening. The display panel is disposed in the receiving recess. The bezel exposes a part of the display panel from the opening. The back shell is assembled to the bezel. The back shell and the bezel cooperatively define an accommodating space. The display panel is accommodated in the accommodating space. The reinforced glass plate is assembled to the bezel for covering the part of the display panel exposed by the opening of the bezel.

According to an embodiment of the present invention, a part of the bezel which is in contact with the reinforced glass plate is made of a rubber material. According to an embodiment of the present invention, the reinforced glass plate is adhered to the bezel by an adhesive tape.

According to an embodiment of the present invention, the bezel further includes a bordering structure configured at a periphery of the bezel for framingly positioning the reinforced glass plate.

According to an embodiment of the present invention, the bordering structure is made of a rubber material.

According to an embodiment of the present invention, the back shell includes a frame, and a housing. The frame is assembled to the bezel, and the housing is assembled to the frame.

According to the foregoing, the present invention attaches a reinforced glass plate on a bezel for covering the display panel, so as to reduce the risk of the display panel being damaged by an impact of external forces.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
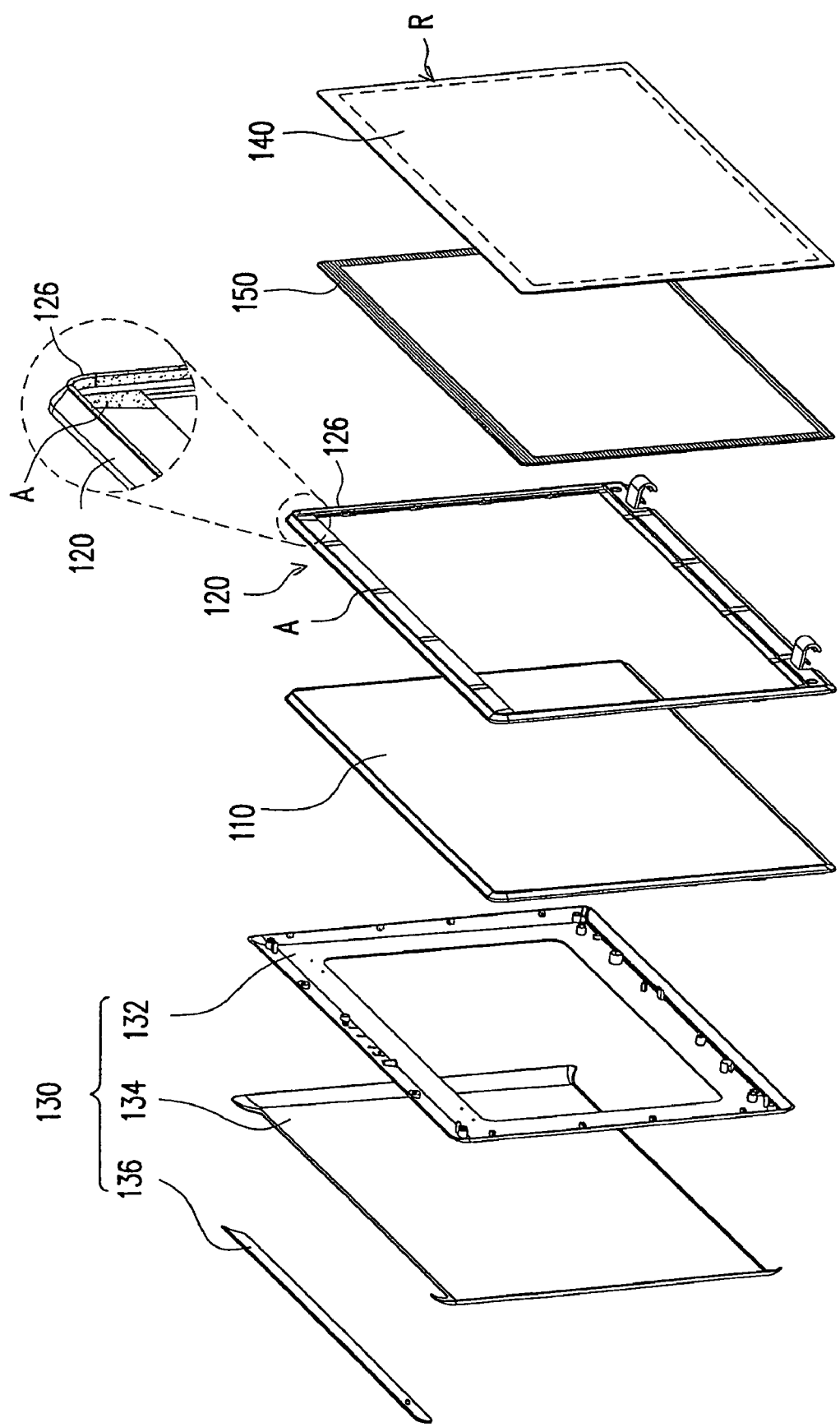
FIG. 1 is an explosive view of a display device according to an embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Figure 2:
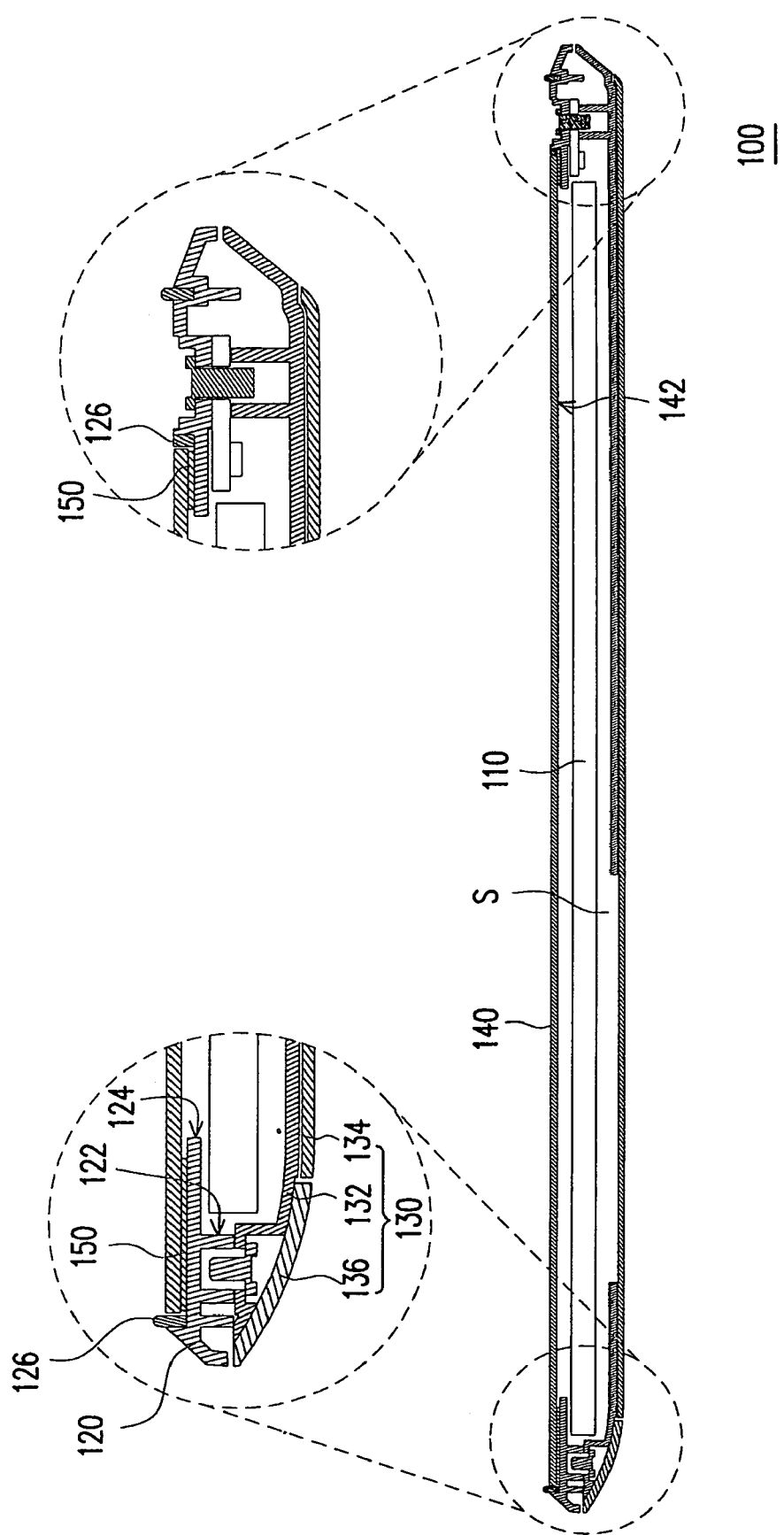
FIG. 2 is a partial cross-sectional view of the display device of FIG. 1.

FIG. 1 is an explosive view of a display device according to an embodiment of the present invention. FIG. 2 is a partial cross-sectional view of the display device of FIG. 1. Referring to FIG. 1, it shows a display device 100 including a display panel 110, a bezel 120, a back shell 130, and a reinforced glass plate 140.

Referring to FIGS. 1 and 2 together, the bezel 120 includes a receiving recess 122 and an opening 124. The display panel 110 is disposed in the receiving recess 122. The bezel 120 exposes a part of the display panel 110 from the opening 124. The back shell 130 is assembled to the bezel 120. The back shell 130 and the bezel 120 cooperatively define an accommodating space S. The display panel 110 is accommodated in the accommodating space S. The reinforced glass plate 140 is assembled to the bezel 120 for covering the part of the display panel 140 exposed by the opening 124 of the bezel 120 for protecting the display panel 140 from being damaged by an impact of external forces.

Referring to FIG. 1, in the present embodiment, the bezel 120 for example is a plastic/rubber structure configured by a co-injection molding process. According to an aspect of the embodiment, a part of the bezel 120, which is in contact with the reinforced glass plate at an area A, is made of a rubber material, for providing a buffer when the display device 100 suffers an impact of external forces. Further, the bezel 120 further includes a bordering structure 126 configured at a periphery of the bezel 120 for framingly positioning the reinforced glass plate 140. The bordering structure 126 for example is made of a rubber material. Because of the elasticity of the rubber material, the bordering structure 126 can provide a buffer and fixing effect to the reinforced glass plate.

In the present embodiment, the bezel 120 and the back shell 130 can be assembled together by fastening. Referring to FIG. 2, in the present embodiment, the reinforced glass plate 140 is adhered to the bezel 120 by an adhesive tape 150. The adhesive tape 150 is provided at a peripheral area R of a surface 142 of the reinforced glass plate 140 which is predetermined to be adhered to the bezel 120, as shown in FIG. 1, so as to glue the reinforced glass plate 140 to the bezel 120.

In the present embodiment, the display panel 110 for example is a liquid crystal display (LCD) panel. Referring to FIGS. 1 and 2 together, the back shell 130 includes a frame 132, and a housing 134. The frame 132 is assembled to the bezel 120 so as to fix the display panel 110 between the frame 122 and the bezel 120. The housing 134 is assembled to the frame 132 for providing a protection and an appearance. Further, the back shell 130 further includes an antenna cover 136 for covering an antenna (not shown in the drawings) disposed to the display device 100.

In summary, the present invention attaches a reinforced glass plate on a bezel for covering the display panel, so as to reduce the risk of the display panel being damaged by an impact of external forces, thus improving the reliability of the display panel. Further, a part of the bezel which is in contact with the reinforced glass plate is made of a rubber material, so as to provide a buffer effect between the bezel and the reinforced glass plate, when the display device suffers an impact of external forces, thus reducing the affection applied to the display panel by the external forces.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display device, adapted for a notebook computer, the display device comprising:
   a display panel;
   a bezel, having a receiving recess and an opening, wherein the display panel is disposed in the receiving recess, and the bezel exposes a part of the display panel from the opening;
   a back shell, assembled with the bezel, wherein the back shell and the bezel cooperatively define an accommodating space, and the display panel is accommodated in the accommodating space; and
   a reinforced glass plate, assembled to the bezel for covering the part of the display panel exposed by the opening of the bezel, wherein the reinforced glass plate is disposed on an outer surface of the bezel and the bezel is located between the reinforced glass plate and the display panel, wherein the bezel further includes a bordering structure configured at a periphery of the outer surface of the bezel for framingly positioning the reinforced glass plate, and the bordering structure is made of a rubber material.

2. The display device according to claim 1, wherein a part of the bezel which is in contact with the reinforced glass plate is made of a rubber material.

3. The display device according to claim 1, wherein the reinforced glass plate is adhered to the bezel by an adhesive tape.

4. The display device according to claim 1, wherein the back shell comprises:
   a frame, assembled to the bezel; and
   a housing, assembled to the frame.

* * * * *